(12) United States Patent
Gajjar et al.

(10) Patent No.: US 12,287,878 B2
(45) Date of Patent: Apr. 29, 2025

(54) SYSTEMS AND METHODS FOR RESTORING CLEAN FILES BASED ON TIMESTAMPS

(71) Applicant: Acronis International GmbH, Schaffhausen (CH)

(72) Inventors: Hiten Gajjar, Singapore (SG); Prabhuraj Reddy, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 185 days.

(21) Appl. No.: 18/165,439

(22) Filed: Feb. 7, 2023

(65) Prior Publication Data

US 2024/0265102 A1 Aug. 8, 2024

(51) Int. Cl.
*G06F 21/56* (2013.01)
*G06F 11/14* (2006.01)

(52) U.S. Cl.
CPC ........ *G06F 21/565* (2013.01); *G06F 11/1464* (2013.01); *G06F 11/1469* (2013.01); *G06F 2201/84* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 9,292,327 | B1* | 3/2016 | von Thenen | G06F 11/1484 |
| 2011/0185421 | A1* | 7/2011 | Wittenstein | H04L 63/1416 |
| | | | | 726/22 |
| 2015/0172304 | A1* | 6/2015 | Kleczynski | H04L 63/1441 |
| | | | | 726/23 |
| 2024/0045964 | A1* | 2/2024 | Bednash | G06F 11/1451 |

* cited by examiner

Primary Examiner — Clayton R Williams
(74) Attorney, Agent, or Firm — ArentFox Schiff LLP; Michael Fainberg

(57) ABSTRACT

Disclosed herein are systems and method for restoring files from a backup, the method including: retrieving a time indicator from a time server associated with a backup server; synchronizing time between the backup server and a computing device performing a backup, based on the time indicator; performing the backup of files from the computing device to the backup server, wherein a malicious process modifies at least one file being backed up at an incident time during the backup and performs an attempt to change a time of the computing device such that a modification timestamp of the at least one file precedes the incident time; blocking the attempt to change the time of the computing device; subsequent to completing the backup, detecting the malicious process infecting the computing device; and performing a restoration of the backup on the computing device.

19 Claims, 5 Drawing Sheets

SYSTEMS AND METHODS FOR RESTORING CLEAN FILES BASED ON TIMESTAMPS

FIELD OF TECHNOLOGY

The present disclosure relates to the field of data recovery, and, more specifically, to systems and methods for restoring clean files based on timestamps.

BACKGROUND

In recovery systems, there is typically a need for automatically recovering clean files from a backup after a threat is detected on the operating system. This recovery is called "rollback" and is one of the main remediation actions taken in endpoint detection and response (EDR) solutions. However, during rollback, without scanning the backups, it is difficult to determine whether the backups have clean files. Backups are generated either on demand or by schedule, and this may happen in parallel while malicious processes have already affected files. This impacts the overall success and purpose of rollback functionality.

EDR rollback is one solution that handles recovery of files affected by malicious processes. There may be alternative solutions, but they have shortfalls. For example, in a solution where backup scanning is enabled, backups are scanned prior to recovery. Not only is this time consuming and a resource heavy operation, but it usually cannot guarantee which are effected files by active threats and which are not. For example, a clean file may be scanned, which wastes further time because the clean file did not need to be scanned. If backup scanning is disabled, then a malicious application in the backup may breach the "recovered" system if restored from that backup. Another trivial approach for rollback involves selecting files in backups whose modification timestamps are earlier than the timestamp of the threat (also referred to as the incident timestamp). Unfortunately, this approach is limited because certain threats may change the modification timestamps of the files. In addition, this approach ignores backups that were running in parallel with a malicious process, and still could have clean files.

There thus exists a need to efficiently perform rollback in a manner that is less time and resource consuming.

SUMMARY

In one exemplary aspect, the techniques described herein relate to a method for restoring files from a backup, the method including: retrieving a time indicator from a time server associated with a backup server; synchronizing time between the backup server and a computing device performing a backup, based on the time indicator; performing the backup of files from the computing device to the backup server, wherein a malicious process modifies at least one file being backed up at an incident time during the backup and performs an attempt to change a time of the computing device such that a modification timestamp of the at least one file precedes the incident time; blocking the attempt to change the time of the computing device; subsequent to completing the backup, detecting the malicious process infecting the computing device; and performing a restoration of the backup on the computing device, by: comparing, for each respective file in the backup, a respective modification timestamp of the file with the incident time of the malicious process; scanning, for malicious attributes, in a subset of the files in the backup whose modification timestamps are at or after the incident time; and restoring all other files in the backup that are not in the subset without scanning for the malicious attributes.

In some aspects, the techniques described herein relate to a method, wherein blocking the attempt to change the time of the computing device further includes resynchronizing the time between the backup server and the computing device.

In some aspects, the techniques described herein relate to a method, wherein the time server executes a network time protocol (NTP).

In some aspects, the techniques described herein relate to a method, wherein blocking the attempt to change the time of the computing device further includes locking time changes on the computing device through a duration of the backup.

In some aspects, the techniques described herein relate to a method, further including: detecting a connectivity issue between the time server of the backup server and the computing device, wherein the connectivity issue prevents synchronization of the time between the backup server and the computing device; and generating a backup metadata file that includes a time of the computing device and modification timestamps of the files in the backup.

In some aspects, the techniques described herein relate to a method, wherein performing the restoration of the backup further includes: determining that the connectivity issue has resolved; comparing a latest time of the computing device with a latest time of the time server; identifying, based on the comparing, a time difference between the computing device and the time server; and adjusting the modification timestamps in the backup metadata file based on the time difference.

In some aspects, the techniques described herein relate to a method, further including: determining that the modification timestamp of the at least one file precedes the incident time; and scanning the at least one file for malicious attributes.

In some aspects, the techniques described herein relate to a method, further including: in response to determining, based on the scanning, that the at least one file has malicious attributes, not restoring the at least one file from the backup.

In some aspects, the techniques described herein relate to a method, further including: in response to determining, based on the scanning, that the at least one file has malicious attributes, performing a remediation action on the at least one file.

It should be noted that the methods described above may be implemented in a system comprising a hardware processor. Alternatively, the methods may be implemented using computer executable instructions of a non-transitory computer readable medium.

In some aspects, the techniques described herein relate to a system for restoring files from a backup, including: a memory; and a hardware processor communicatively coupled with the memory and configured to: retrieve a time indicator from a time server associated with a backup server; synchronize time between the backup server and a computing device performing a backup, based on the time indicator; perform the backup of files from the computing device to the backup server, wherein a malicious process modifies at least one file being backed up at an incident time during the backup and performs an attempt to change a time of the computing device such that a modification timestamp of the at least one file precedes the incident time; block the attempt to change the time of the computing device; subsequent to completing the backup, detect the malicious process infecting the computing device; and perform a restoration of the backup on the computing device, by: comparing, for each respective file in the backup, a respective modification timestamp of the file with the incident time of the malicious process; scanning, for malicious attributes, in a subset of the files in the backup whose modification timestamps are at or after the incident time; and restoring all other files in the backup that are not in the subset without scanning for the malicious attributes.

In some aspects, the techniques described herein relate to a non-transitory computer readable medium storing thereon computer executable instructions for restoring files from a backup, including instructions for: retrieving a time indicator from a time server associated with a backup server; synchronizing time between the backup server and a computing device performing a backup, based on the time indicator; performing the backup of files from the computing device to the backup server, wherein a malicious process modifies at least one file being backed up at an incident time during the backup and performs an attempt to change a time of the computing device such that a modification timestamp of the at least one file precedes the incident time; blocking the attempt to change the time of the computing device; subsequent to completing the backup, detecting the malicious process infecting the computing device; and performing a restoration of the backup on the computing device, by: comparing, for each respective file in the backup, a respective modification timestamp of the file with the incident time of the malicious process; scanning, for malicious attributes, in a subset of the files in the backup whose modification timestamps are at or after the incident time; and restoring all other files in the backup that are not in the subset without scanning for the malicious attributes.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for restoring clean files based on timestamps. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
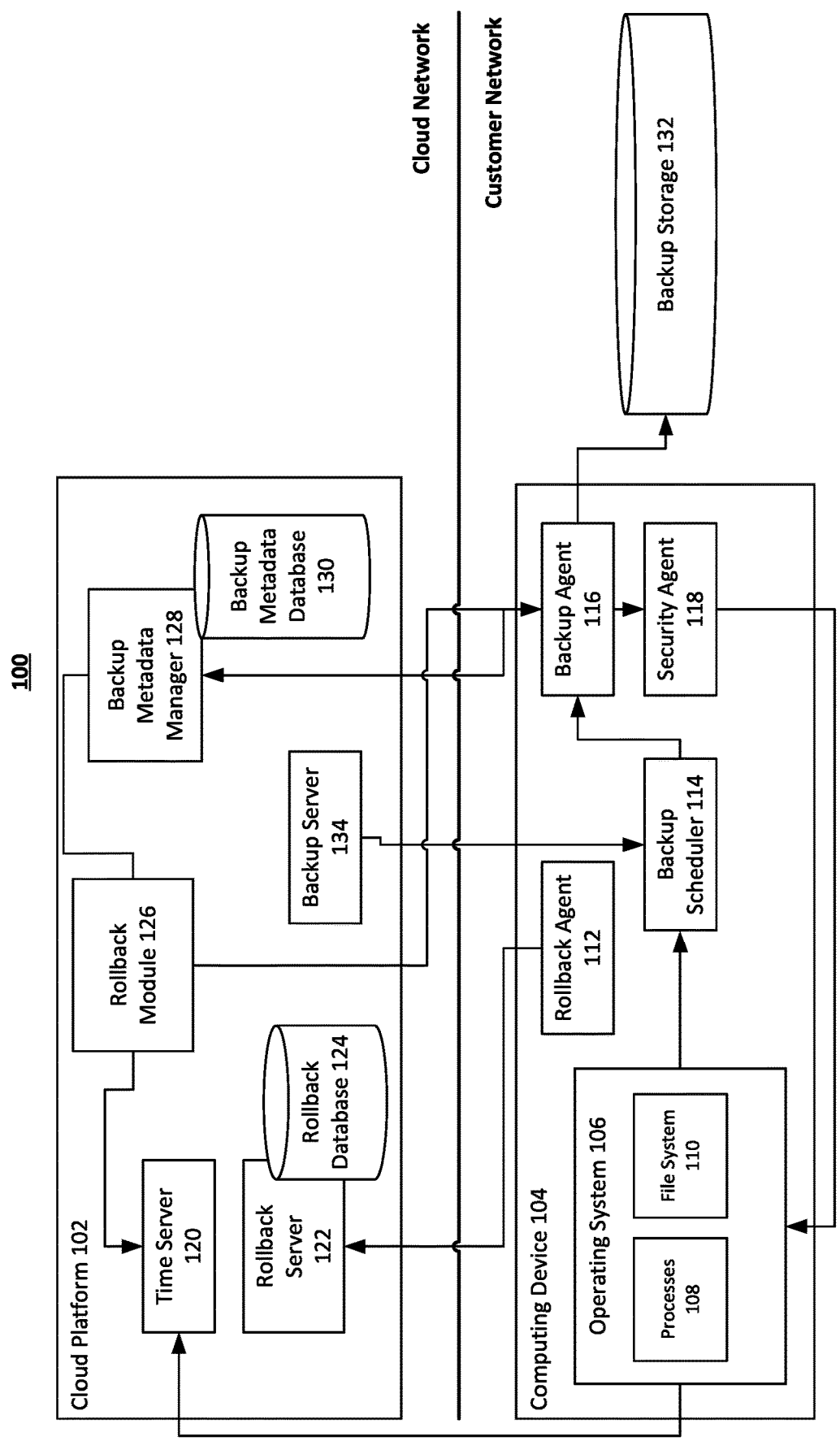
FIG. 1 is a block diagram illustrating a system for restoring clean files based on timestamps.

FIG. 1 is a block diagram illustrating a system for restoring clean files based on timestamps. To overcome the shortcomings described in conventional recovery solutions, the present disclosure describes the usage of a time server 120 employing the network time protocol (NTP) to synchronize the time on a backup agent with the time on a backup server during a backup process. If time synchronization is not available at the time of a backup, the modification timestamp of a file is determined when the backup is reported to the backup server. All files whose modification timestamp is earlier than the incident timestamp will be eligible for restore without the need for backup scanning. In some aspects, the incident time is the very first malicious activity detection time or the very first suspicious activity detection time associated with a malicious process.

Consider the following backup timeline:
T1: Backup starts without snapshot
T2: Malicious process alters system date, a few files, and an EDR incident is created
T3: Backup process backs up the altered files
T4: Backup is completed T1, T2, T3, and T4 are timestamps in chronological order and represent activity on an agent device. It should be noted that malicious processes can change the timestamp of the device before altering files on the filesystem. Because the backup slice has altered files by the malicious process, the backup is not entirely reliable for restoration purposes. However, there is no effective way to ignore this slice as a whole by solely relying on the backup creation timestamp. EDR solutions track the file mutations by malicious processes and record the file modification timestamps. This information is later used to compare with a clean file's modification timestamps. Here, a clean file is one that has not been created or modified by a malicious process. Because any file that has been created, modified, or deleted is a potential candidate for rollback, the modification timestamp also includes when a file was created, when it was modified, and/or when it was deleted.

In terms of implementation steps, the pre-requisites include a system that has a list of affected files along with their modification timestamp, and a backup agent and backup server that are time synchronized using the same NTP. In a first scenario, the agent device and time server have a stable connection. The backup client synchronizes the device time with NTP before the backup process starts and after the backup process ends. The backup client locks changing of the system timestamp for the period of backup process by adjusting system time configurations and access permissions. The backup start timestamp is additionally reported to the backend (later used by the rollback process for decision-making purposes). In terms of rollback, the system considers files created before the incident timestamp and/or whose files modification timestamp (files in backup) is before the incident timestamp.

For example, system 100 includes computing device 104 with operating system 106. Operating system 106 may run processes 108 and file system 110. In one aspect, files in file system 110 may be backed up locally to backup storage 132 in the customer network. In another aspect, files in file system 110 may be backed up to a cloud network such as cloud platform 102. Cloud platform 102 includes backup server 134, time server 120, rollback server 122, rollback database 124, rollback module 126, backup metadata manager 128, and backup metadata database 130. Computing device 104 includes rollback agent 112, backup scheduler 114, backup agent 116, and security agent 118.

In a first scenario, backup scheduler 114 exchanges a backup schedule with backup server 134. The schedule indicates when backups of filing system 110 are to be performed (e.g., frequency of backups, periodicity, special conditions, etc.) and which directories/files are to be backed up. In some aspects, a backup can be triggered manually using its command line interface or by backup scheduler 114.

Backup agent 116 retrieves the files to be backed up and, prior to initializing the backup, synchronizes the time of computing device 104 with time server 120. When the backup is initialized, backup agent 116 transmits the backup start timestamp to backup metadata manager 128, which in some aspects, may also synchronize its time with time server 120. The backup start timestamp is stored in backup metadata database 130 by backup metadata manager 128.

In some aspects, security agent 118 may lock time changes on computing device 104 through the duration of the backup. As files are uploaded to backup server 134, backup agent 116 identifies the respective modification timestamp for each file in the metadata of the file. The modification timestamp represents the last time the file was modified. Backup metadata manager 128 stores the metadata in backup metadata database 130. Once the backup is complete, backup metadata manager 128 stores the backup completion timestamp in backup metadata database 130.

Suppose that a malicious process infects operating system 106 during the backup. As mentioned previously, the malicious process may change the modification timestamp of the files it alters such that it appears that the files were modified before the malicious process was even detected by security agent 118. In other words, if a backup starts at time t1 and the malicious process is detected on time t2 (i.e., the process alters files at t2), the malicious process may change the modification timestamps of its altered files to a time before t2 (e.g., t0). During rollback, this would give the impression that the altered file was not actually modified by the malicious process because the incident timestamp of the malicious process is after the modification timestamp. In an exemplary aspect, security agent 118 may not detect the malicious process immediately. For example, security agent 118 may periodically scan operating system 106 and determine that the incident timestamp is when security agent 118 detected the malicious process. By the time of detection, the backup process may already have been completed. The latest backup includes the most recent changes to the computing device 104, which is why it cannot simply be discarded. Accordingly, rollback agent 112 may initiate a rollback process. Rollback agent 112 thus transmits an incident timestamp of the malicious process (i.e., when the malicious process was detected) to rollback server 122, which stores the incident timestamp in rollback database 124.

Rollback module 126 then retrieves, from backup metadata database 130, a list of files in the latest backup before the incident timestamp (e.g., the backup with potential infected files) and the modification timestamps of the files. The retrieval may involve reading the backup metadata or reading from a central file system where such files may be saved. Rollback module 126 compares the modification timestamps with the incident timestamps. Because the modification timestamps are not tampered with, the comparison of timestamps successfully yields a determination of whether the file was modified after the incident timestamp (in which case the file should be scanned). If the modification timestamp is before the incident timestamp, the file does not need to be scanned and processing is saved as the files are downloaded back to computing device 104.

In some aspects, instead of evaluating the timestamps of all files in a backup, security agent 118 may identify the file(s) that are infected and need to be rolled back. Backup agent 116 subsequently scans the backup for the existence of the file(s) using absolute file paths or file identifiers (if available) from the effected file information in rollback database (i.e., the rollback database gets items from the file operation event as it happens on the computing device because the computing device has an agent application which tracks all the processes and operations done by the processes on the files, network operations, etc.). If file(s) exist in the backup, then the modification timestamp of that file is compared against the first suspicious timestamp of the incident.

Figure 2:
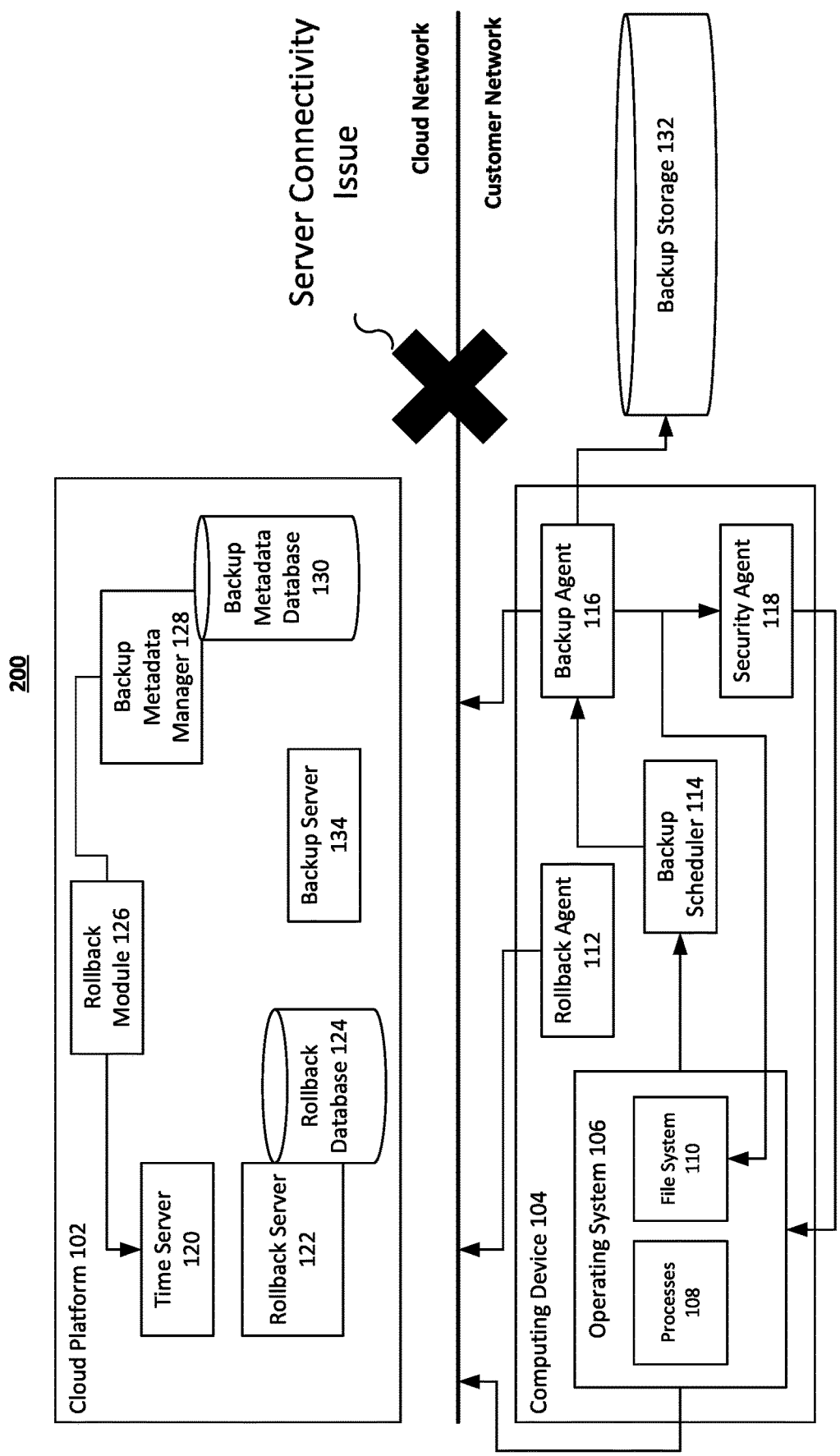
FIG. 2 is a block diagram illustrating a system for backing up files during server connectivity issues.

FIG. 2 is a block diagram illustrating system 200 for backing up files during server connectivity issues. In another scenario, computing device 104 may be unable to synchronize with the time server 120 (e.g., due to network issues or a malicious process that has blocked NTP sync). In this case, backup agent 116 locks changing of timestamp for the period of backup process. Here, the backup may be stored locally on backup storage 132. Backup agent 116 maintains the device time in a backup metadata file. In some aspects, the backup metadata file includes backup information, agent timestamps including backup start and end times, and each time the user changes the timestamp (used to determine the delta of timestamp between agent and server timestamps when server connectivity is restored). The backup metadata file also includes information about each time file synchronization performed with time server 120.

Figure 3:
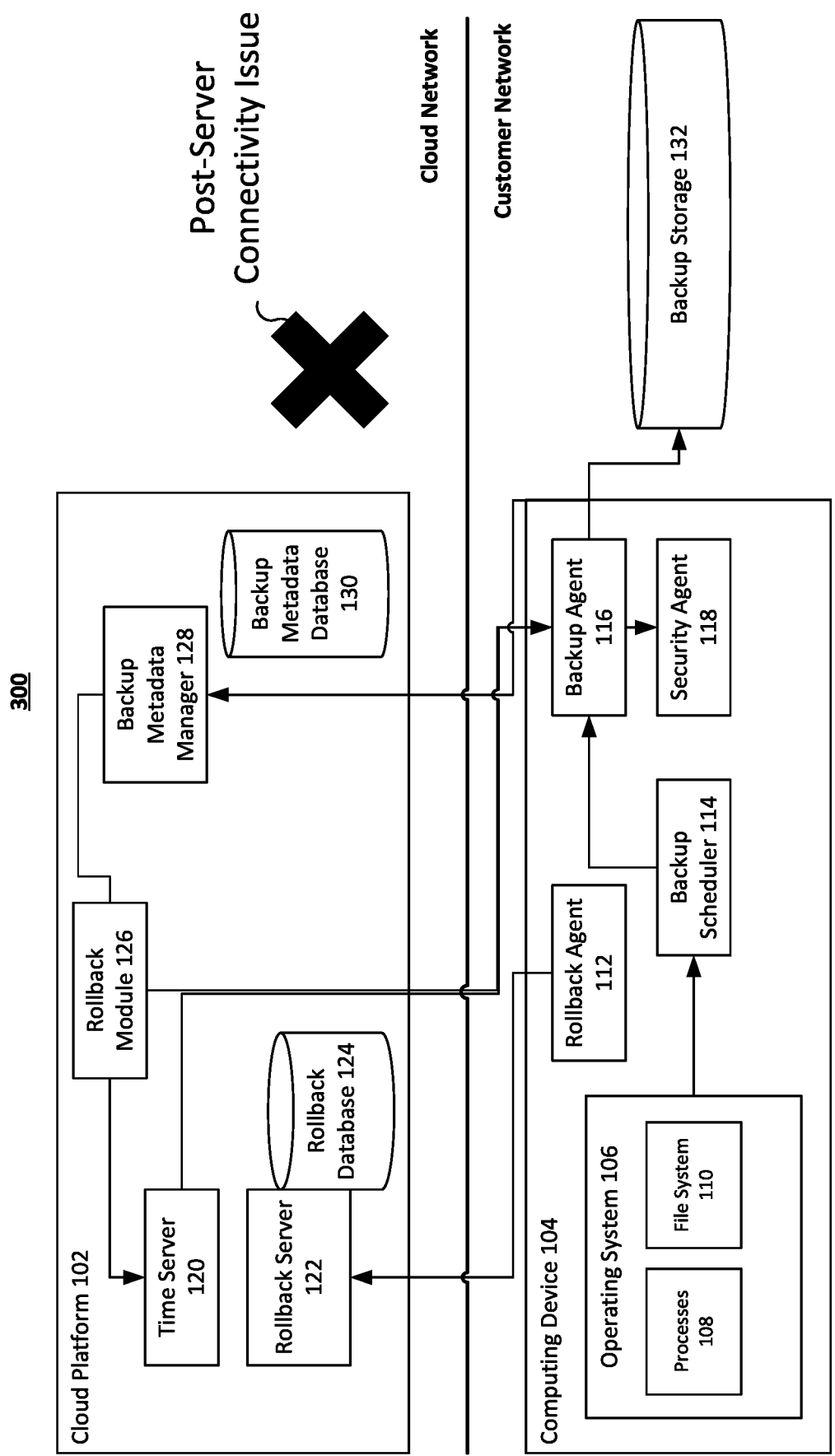
FIG. 3 is a block diagram illustrating a system for restoring clean files during server connectivity issues.

FIG. 3 is a block diagram illustrating system 300 for restoring clean files during server connectivity issues. After backup completion, security agent 118 keeps monitoring for time change events on the system computing device 104 (e.g., changes to the system time or modification times of files on file system 110) and reports the time to the backend server when a server connection is re-established. Backup agent 116 then receives the backend server time when the connection is re-established and backup agent 116 compares the time in the backup metadata file with the received backend server time and reports the backup creation time that is aligned with the backend server time. During rollback, the backup client will always adjust the file's modification timestamp based on the backend server time that is part of the backup metadata.

In particular, backup agent 116 gets backup information and timestamps from backup scheduler 114. Backup agent 116 updates backups with an agent timestamp per file. There may also be a chain of timestamps for a file if the user/malicious process changed the file multiple times. Backup agent 116 then retrieves the server time from time server 120. In some aspects, backup agent 116 may request operating system 106 to update the time from time server 120. Backup agent 116 updates the backup metadata file in backup storage 132 with the server time retrieved from time server 120.

Rollback module 126 triggers rollback by getting a list of files and their modification timestamps from backup agent.

Rollback module 126 specifically retrieves the list of files from a backup whose completion time precedes the incident time associated with the malicious entity. Rollback module 126 then identifies the files with a modification timestamp before the incident time. These files are clean and may be downloaded without scanning. All other files where the modification timestamp is after the incident time are scanned prior to reinstating the backup.

There may be certain limitations to be considered. For example, the user may change the file modification timestamp manually. In terms of migration, a kernel module restricts file modification timestamp while backup is in progress. Such a restriction is to be imposed on a folder/volume that is part of the backup. The problem window can be narrowed, but cannot completely be eliminated because there is no blanket rule to ban the change of a file modification timestamp.

Figure 4:
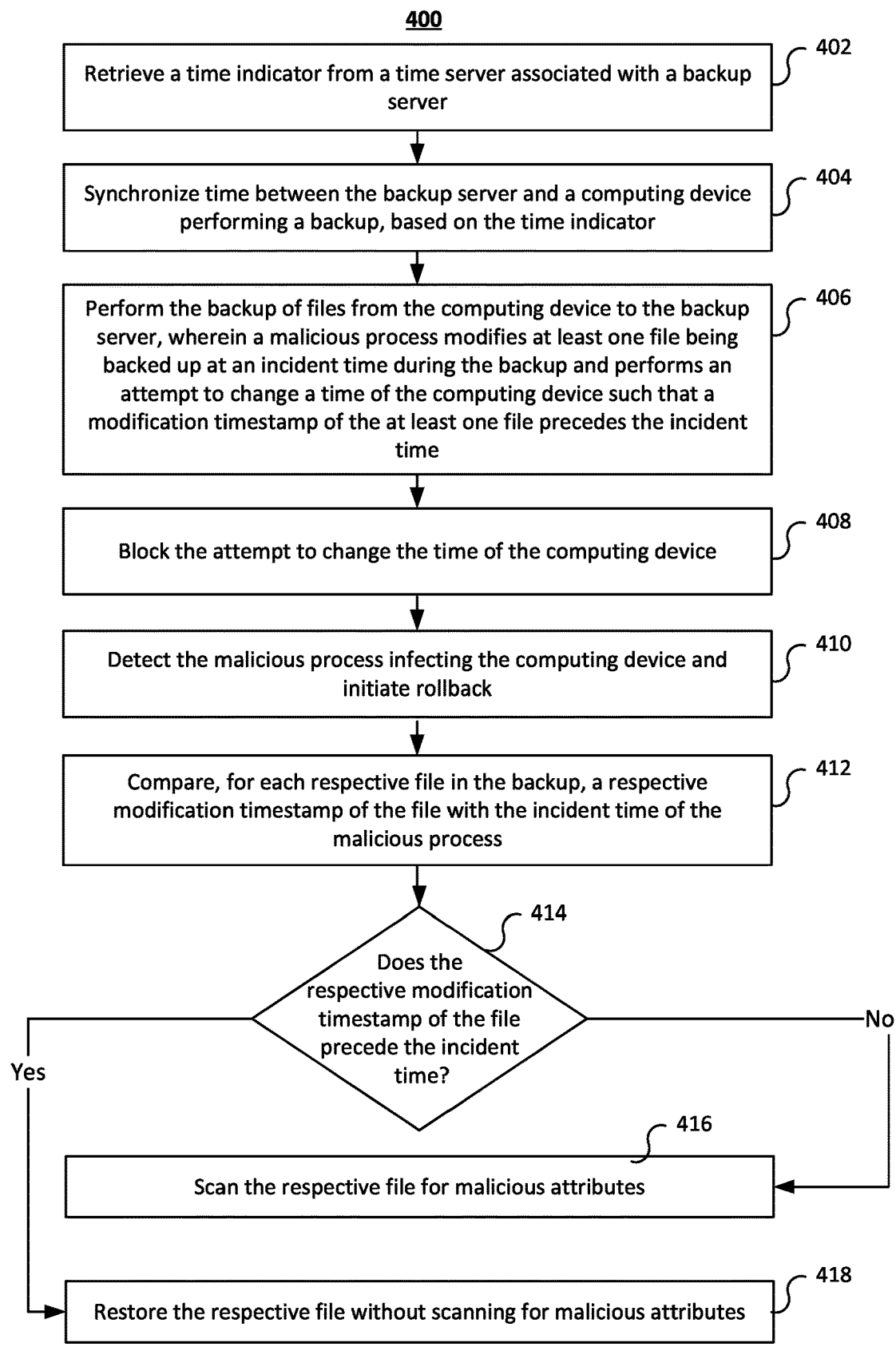
FIG. 4 illustrates a flow diagram of a method for restoring clean files based on timestamps.

FIG. 4 illustrates a flow diagram of method 400 for restoring clean files in endpoint detection and response (EDR) solutions. At 402, backup agent 116 retrieves a time indicator from time server 120 associated with backup server 134. At 404, backup agent 116 synchronizes time between backup server 134 and computing device 104 performing a backup, based on the time indicator. More specifically, backup agent 116 may command operating system 106 to perform a time synchronization with time server 120. In some aspects, the time server executes the network time protocol (NTP). Accordingly, operating system 106 will then perform the time synchronization with time server 120 using NTP. For example, if the time according to time server 120 (as listed in the time indicator) is Oct. 1, 2022 at 14:01:11, the time of computing device 104 is updated to match that time.

At 406, backup agent 116 performs the backup of files from computing device 104 to backup server 134 by uploading files. During the backup, a malicious process may infect computing device 104 (e.g., by performing a suspicious action) at an incident time (e.g., Oct. 1, 2022 at 14:12:12). The malicious process may modify at least one file that is going to be backed up during the backup. For example, the malicious process may include malicious attributes into the file (e.g., inject the file with malicious code, install a plugin, remove/disable a safety feature, etc.). Prior to modifying the at least one file, the malicious process perform an attempt to change a time of the computing device such that a modification timestamp of the at least one file precedes the incident time. For example, the malicious process may attempt to change the time to Oct. 1, 2022 at 14:08:43. Thus, the modification timestamp would become Oct. 1, 2022 at 14:08:43 (which is before the incident time).

In some aspects, backup agent 116 may also calculate the backup and file timestamp in case the time on computing device 104 was not in sync with the time server 120. The system time changes on computing device 104 are tracked along with system time synchronization changes. This tracking helps in recalculating the file modification timestamp that is synchronized with time server 120 or backup server 134.

At 408, security agent 118 blocks the attempt to change the time of computing device 104. In some aspects, blocking the attempt to change the time of the computing device further comprises resynchronizing the time between time server 120 and computing device 104. Thus, even if the time changes on computing device 104, because of frequent time synchronizations, the time remains correct. In some aspects, blocking the attempt to change the time of the computing device further comprises locking time changes on computing device 104 through a duration of the backup. Thus, even if the malicious process is configured to change the time, the malicious process will fail in doing so. For example, backup agent 116 may notify security agent 118 about the start time of a backup and security agent 118 may lock time changes from that start time. Subsequently, may notify security agent 118 about the end time of the backup and security agent 118 may unlock time changes from that end time.

At 410, subsequent to completing the backup, security agent 118 detects the malicious process infecting computing device 104 and rollback agent 112 initiates rollback. In some aspects, the detection timestamp is recorded by security agent 118. At 412, rollback agent 112 performs a restoration of the backup on computing device 104 by comparing, for each respective file in the backup, a respective modification timestamp of the file with the incident time of the malicious process.

At 414, rollback agent 112 determines whether the respective modification timestamp precedes the incident time of the malicious process. In response to determining that it does not precede the incident time of the malicious process (i.e., the file was modified after the presence of the malicious process), the file is included in a subset of the files that need to be scanned before being restored. At 416, the respective file is scanned for malicious attributes by security agent 118. It should be noted that security agent 118 is regularly updated with new definitions and thus there are chances that a file with malicious attribute(s) was not detected earlier, but at the time of rollback, is detected. If, for a respective file the modification timestamp precedes the incident timestamp, method 400 advances to 418, where the respective file is restored by rollback agent 112 and backup agent 116 on computing device 104.

Referring to the at least one file discussed above, because the malicious process infected the at least one file, rollback agent 112 determines that the modification timestamp of the at least one file precedes the incident time, and security agent 118 scans the at least one file for malicious attributes. In response to determining, based on the scanning, that the at least one file has malicious attributes, rollback agent 112 does not restore the at least one file from the backup. It should be noted that if the malicious process is successful is changing the time, the at least one file would not be scanned. This is a flaw in conventional systems and is resolved by the systems and methods of the present disclosure.

In some aspects, in response to determining, based on the scanning, that the at least one file has malicious attributes, security agent 118 performs a remediation action on the at least one file. The remediation action may involve quarantining or removing the at least one file. In some aspects, the remediation action may involve identifying the latest backup that includes a clean version of the at least one file and restoring the at least one file from that backup.

In some aspects, backup agent 116 may detect a connectivity issue between time server 120 of backup server 134 and computing device 104, wherein the connectivity issue prevents synchronization of the time between backup server 134 and computing device 104. Accordingly, backup agent 116 may generate a backup metadata file that includes a time of the computing device and modification timestamps of the files in the backup. The backup metadata file may include all of the changed times of the files as well. Because time change events may cause inconsistencies in the backup metadata file (e.g., a time jump from Oct. 1, 2022 at 14:01:11 to Oct. 1, 2022 at 14:01:00), it is possible to track how the modification timestamps are affected.

For example, rollback agent 112 may subsequently determine that the connectivity issue has resolved and compare a latest time of computing device 104 with a latest time of time server 120. Rollback agent 112 may then identify, based on the comparing, a time difference (if any) between computing device 104 and time server 120. For example, there may be a difference of 10 seconds between the two entities. Accordingly, rollback agent 112, when comparing modification timestamps with the incident timestamp, may adjust the modification timestamps in the backup metadata file based on the time difference. For example, if time server 120 is ahead by 10 seconds, the modification timestamps may be adjusted by adding 10 seconds. Therefore, if a malicious process causes a change in a modification timestamp, the change is rendered negligible.

Figure 5:
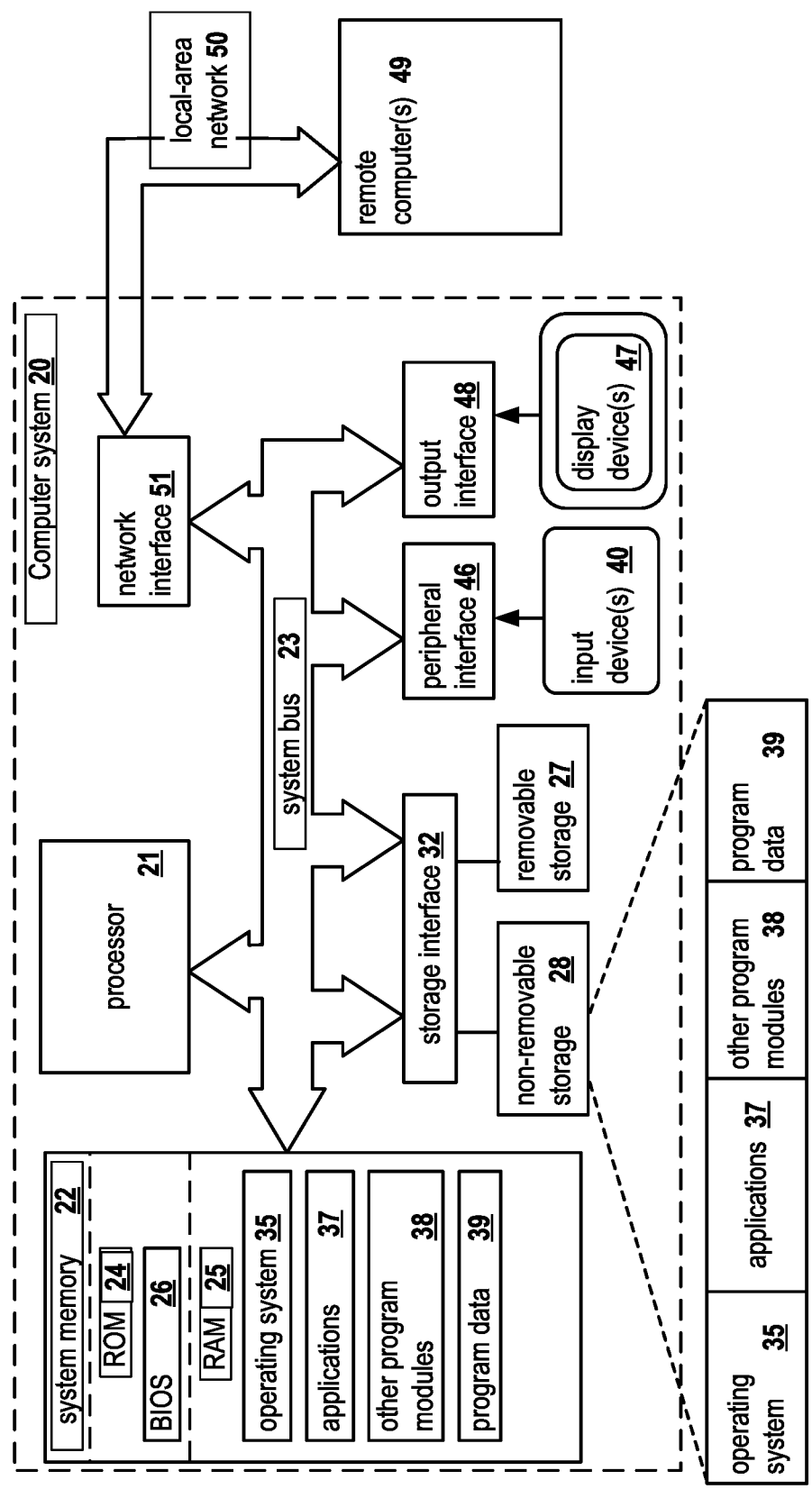
FIG. 5 presents an example of a general-purpose computer system on which aspects of the present disclosure can be implemented.

FIG. 5 is a block diagram illustrating a computer system 20 on which aspects of systems and methods for restoring clean files in endpoint detection and response (EDR) solutions may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for restoring files from a backup, the method comprising:
   retrieving a time indicator from a time server associated with a backup server;
   synchronizing time between the backup server and a computing device performing a backup, based on the time indicator;
   performing the backup of files from the computing device to the backup server, wherein a malicious process modifies at least one file being backed up at an incident time during the backup and performs an attempt to change a time of the computing device, wherein a modification timestamp of the at least one file precedes the incident time;
   blocking the attempt to change the time of the computing device;
   subsequent to completing the backup, detecting the malicious process infecting the computing device; and
   performing a restoration of the backup on the computing device, by:
      comparing, for each respective file in the backup, a respective modification timestamp of the file with the incident time of the malicious process;
      scanning, for malicious attributes, in a subset of the files in the backup whose modification timestamps are at or after the incident time; and
      restoring all other files in the backup that are not in the subset without scanning for the malicious attributes.

2. The method of claim 1, wherein blocking the attempt to change the time of the computing device further comprises resynchronizing the time between the backup server and the computing device.

3. The method of claim 2, wherein the time server executes a network time protocol (NTP).

4. The method of claim 1, wherein blocking the attempt to change the time of the computing device further comprises locking time changes on the computing device through a duration of the backup.

5. The method of claim 1, further comprising:
   detecting a connectivity issue between the time server of the backup server and the computing device, wherein the connectivity issue prevents synchronization of the time between the backup server and the computing device; and generating a backup metadata file that includes a time of the computing device and modification timestamps of the files in the backup.

6. The method of claim 5, wherein performing the restoration of the backup further comprises:
determining that the connectivity issue has resolved;
comparing a latest time of the computing device with a latest time of the time server; identifying, based on the comparing, a time difference between the computing device and the time server; and
adjusting the modification timestamps in the backup metadata file based on the time difference.

7. The method of claim 1, further comprising:
determining that the modification timestamp of the at least one file precedes the incident time; and
scanning the at least one file for malicious attributes.

8. The method of claim 7, further comprising:
in response to determining, based on the scanning, that the at least one file has malicious attributes, not restoring the at least one file from the backup.

9. The method of claim 7, further comprising:
in response to determining, based on the scanning, that the at least one file has malicious attributes, performing a remediation action on the at least one file.

10. A system for restoring files from a backup, comprising:
a memory; and
a hardware processor communicatively coupled with the memory and configured to:
retrieve a time indicator from a time server associated with a backup server;
synchronize time between the backup server and a computing device performing a backup, based on the time indicator;
perform the backup of files from the computing device to the backup server, wherein a malicious process modifies at least one file being backed up at an incident time during the backup and performs an attempt to change a time of the computing device, wherein-such that a modification timestamp of the at least one file precedes the incident time;
block the attempt to change the time of the computing device;
subsequent to completing the backup, detect the malicious process infecting the computing device; and
perform a restoration of the backup on the computing device, by:
comparing, for each respective file in the backup, a respective modification timestamp of the file with the incident time of the malicious process;
scanning, for malicious attributes, in a subset of the files in the backup whose modification timestamps are at or after the incident time; and
restoring all other files in the backup that are not in the subset without scanning for the malicious attributes.

11. The system of claim 10, wherein the hardware processor is configured to block the attempt to change the time of the computing device by resynchronizing the time between the backup server and the computing device.

12. The system of claim 11, wherein the time server executes a network time protocol (NTP).

13. The system of claim 10, wherein the hardware processor is configured to block the attempt to change the time of the computing device by locking time changes on the computing device through a duration of the backup.

14. The system of claim 10, wherein the hardware processor is configured to:
detect a connectivity issue between the time server of the backup server and the computing device, wherein the connectivity issue prevents synchronization of the time between the backup server and the computing device; and
generate a backup metadata file that includes a time of the computing device and modification timestamps of the files in the backup.

15. The system of claim 14, wherein the hardware processor is configured to perform the restoration of the backup by:
determining that the connectivity issue has resolved;
comparing a latest time of the computing device with a latest time of the time server;
identifying, based on the comparing, a time difference between the computing device and the time server; and
adjusting the modification timestamps in the backup metadata file based on the time difference.

16. The system of claim 10, wherein the hardware processor is configured to:
determine that the modification timestamp of the at least one file precedes the incident time; and
scan the at least one file for malicious attributes.

17. The system of claim 16, wherein the hardware processor is configured to:
in response to determining, based on the scanning, that the at least one file has malicious attributes, not restore the at least one file from the backup.

18. The system of claim 16, wherein the hardware processor is configured to:
in response to determining, based on the scanning, that the at least one file has malicious attributes, perform a remediation action on the at least one file.

19. A non-transitory computer readable medium storing thereon computer executable instructions for restoring files from a backup, including instructions for:
retrieving a time indicator from a time server associated with a backup server;
synchronizing time between the backup server and a computing device performing a backup, based on the time indicator;
performing the backup of files from the computing device to the backup server, wherein a malicious process modifies at least one file being backed up at an incident time during the backup and performs an attempt to change a time of the computing device, wherein a modification timestamp of the at least one file precedes the incident time;
blocking the attempt to change the time of the computing device;
subsequent to completing the backup, detecting the malicious process infecting the computing device; and
performing a restoration of the backup on the computing device, by:
comparing, for each respective file in the backup, a respective modification timestamp of the file with the incident time of the malicious process;
scanning, for malicious attributes, in a subset of the files in the backup whose modification timestamps are at or after the incident time; and restoring all other files in the backup that are not in the subset without scanning for the malicious attributes.

* * * * *